(12) United States Patent
Watson

(10) Patent No.: US 8,015,809 B2
(45) Date of Patent: Sep. 13, 2011

(54) RECIRCULATION OF EXHAUST GAS CONDENSATE

(75) Inventor: David Eugene Watson, Waukesha, WI (US)

(73) Assignee: Dresser, Inc., Addison, TX (US)

( * ) Notice: Subject to any disclaimer, the term of this patent is extended or adjusted under 35 U.S.C. 154(b) by 694 days.

(21) Appl. No.: 12/030,972

(22) Filed: Feb. 14, 2008

(65) Prior Publication Data
US 2009/0205326 A1 Aug. 20, 2009

(51) Int. Cl.
*F02B 33/44* (2006.01)
*F02B 29/04* (2006.01)
*F02M 25/07* (2006.01)
*F02B 47/02* (2006.01)

(52) U.S. Cl. .............. 60/605.2; 60/599; 123/568.11; 123/568.12; 123/25 A

(58) Field of Classification Search ............ 60/605.2, 60/309, 599; 123/25 A, 568.11–568.12, 123/563–564; F02M 25/07
See application file for complete search history.

(56) References Cited

U.S. PATENT DOCUMENTS

| | | | | |
|---|---|---|---|---|
| 3,224,186 A * | 12/1965 | Wood | | 60/599 |
| 3,983,882 A | 10/1976 | Billings | | |
| 4,055,158 A * | 10/1977 | Marsee | | 123/568.12 |
| 4,114,370 A | 9/1978 | Woods | | |
| 4,279,223 A | 7/1981 | Csonka et al. | | |
| 4,314,446 A | 2/1982 | Bull | | |
| 4,412,512 A | 11/1983 | Cottell | | |
| 4,503,813 A | 3/1985 | Lindberg | | |
| 4,696,279 A | 9/1987 | Lindberg | | |
| 4,884,533 A | 12/1989 | Risitano et al. | | |
| 4,918,916 A | 4/1990 | Tiberg | | |
| 5,241,940 A * | 9/1993 | Gates, Jr. | | 123/568.27 |
| 5,271,215 A * | 12/1993 | Guillet | | 60/39.5 |
| 6,301,887 B1 * | 10/2001 | Gorel et al. | | 60/605.2 |
| 6,301,888 B1 * | 10/2001 | Gray, Jr. | | 60/605.2 |
| 6,367,256 B1 * | 4/2002 | McKee | | 60/605.2 |
| 6,470,682 B2 * | 10/2002 | Gray, Jr. | | 60/605.2 |
| 6,598,396 B2 * | 7/2003 | Bailey | | 60/605.2 |
| 6,705,253 B2 | 3/2004 | Lesniak | | |
| 6,748,741 B2 * | 6/2004 | Martin et al. | | 60/605.2 |
| 6,845,738 B2 * | 1/2005 | Frutschi | | 123/25 C |
| 6,892,531 B2 | 5/2005 | Rim | | |
| 6,978,772 B1 * | 12/2005 | Dorn et al. | | 123/568.12 |
| 7,131,263 B1 * | 11/2006 | Styles | | 60/278 |
| 7,451,750 B1 * | 11/2008 | Fox et al. | | 123/568.12 |

(Continued)

FOREIGN PATENT DOCUMENTS

DE 3310933 A1 * 9/1984

(Continued)

*Primary Examiner* — Thai Ba Trieu
(74) *Attorney, Agent, or Firm* — Fish & Richardson P.C.

(57) ABSTRACT

Systems for operating on an internal combustion engine coupled to an exhaust conduit and an intake conduit include an exhaust gas recirculation conduit in fluid communication with the exhaust conduit, a heat exchanger coupled to the exhaust gas recirculation conduit to cool at least a portion of the amount of exhaust, a liquid accumulator adapted to accumulate liquid from at least a portion of the amount of exhaust, and a condensate conduit coupled to the liquid accumulator. Methods of operating an engine include: receiving an exhaust gas recirculation stream from a main exhaust stream, cooling the exhaust gas recirculation stream, removing at least some condensate from the exhaust gas recirculation stream after cooling, and adding at least some of the condensate removed from the exhaust gas recirculation stream to the main exhaust stream and/or to an inlet charge of the engine.

20 Claims, 6 Drawing Sheets

U.S. PATENT DOCUMENTS

| | | | | |
|---|---|---|---|---|
| 7,530,336 B2 * | 5/2009 | Brecheisen, II | ............. | 123/25 A |
| 7,797,937 B2 * | 9/2010 | Endicott et al. | .......... | 123/568.12 |
| 2004/0079079 A1 * | 4/2004 | Martin et al. | ................ | 60/605.2 |
| 2010/0229549 A1 * | 9/2010 | Taylor | ............................. | 60/599 |
| 2011/0079002 A1 * | 4/2011 | Siuchta | .................... | 123/568.12 |
| 2011/0100341 A1 * | 5/2011 | Yacoub | .................... | 123/568.11 |

FOREIGN PATENT DOCUMENTS

| | | | |
|---|---|---|---|
| DE | 19936704 | A1 * | 2/2001 |
| DE | 102005023958 | A1 * | 11/2006 |
| EP | 1548269 | A1 * | 6/2005 |
| EP | 1724453 | A1 * | 11/2006 |
| JP | 2008280945 | A * | 11/2008 |

* cited by examiner

RECIRCULATION OF EXHAUST GAS CONDENSATE

TECHNICAL FIELD

This invention relates to exhaust gas recirculation, and more specifically condensate from exhaust gas recirculation.

BACKGROUND

One method of reducing emissions from internal combustion engines is exhaust gas recirculation. In internal combustion engines implementing exhaust gas recirculation, at least some of the exhaust gases are directed back into the engines. Thus, a portion of the exhaust makes a second pass through the combustion chamber(s). In some instances, exhaust gas recirculation is implemented on internal combustion engines provided with a turbocharger.

SUMMARY

In some aspects, systems for operating on an internal combustion engine include: an exhaust gas recirculation conduit in fluid communication with the exhaust conduit and the engine to receive an amount of exhaust from the exhaust conduit and direct at least a portion of the amount of exhaust into the intake conduit; a heat exchanger coupled to the exhaust gas recirculation conduit to cool at least a portion of the amount of exhaust; a liquid accumulator adapted to accumulate liquid from at least a portion of the amount of exhaust and a condensate conduit coupled to the liquid accumulator and the exhaust conduit to receive at least a portion of the liquid and direct at least a portion of the liquid into the exhaust conduit. The engine can be coupled to an exhaust conduit and an intake conduit.

In some aspects, systems for operating on an internal combustion engine include: an exhaust gas recirculation conduit in fluid communication with the exhaust conduit and the engine to receive an amount of exhaust and direct at least a portion of the amount of exhaust back into the engine; a heat exchanger coupled to the exhaust gas recirculation conduit to cool at least a portion of the amount of exhaust; a liquid accumulator adapted to accumulate liquid from at least a portion of the amount of exhaust and a condensate conduit coupled to the liquid accumulator and to the intake conduit to receive at least a portion of the liquid and direct at least a portion of the liquid into the intake conduit between the compressor and an outlet of the intercooler. The internal combustion engine can be coupled to an intake conduit and an exhaust conduit, a compressor in the intake conduit adapted to compress an intake charge, and an intercooler in the intake conduit adapted to cool the intake charge.

In some aspects, methods of operating an engine include: receiving an exhaust gas recirculation stream from a main exhaust stream; cooling the exhaust gas recirculation stream, removing at least some condensate from the exhaust gas recirculation stream after cooling, and adding at least some of the condensate removed from the exhaust gas recirculation stream to the main exhaust stream.

In some aspects, methods of operating an engine include: receiving an exhaust gas recirculation stream from a main exhaust stream; cooling the exhaust gas recirculation stream, removing at least some condensate from the exhaust gas recirculation stream after cooling, and adding at least some of the condensate removed from the exhaust gas recirculation stream to an inlet charge of the engine.

Embodiments of these systems and methods can include one or more of the following features.

In some embodiments, a turbocharger is in the exhaust conduit and the condensate conduit is coupled to the exhaust conduit to direct at least a portion of the liquid into the exhaust conduit upstream of an exhaust outlet of the turbocharger. In some cases, the condensate conduit is coupled to the exhaust conduit to direct at least a portion of the liquid into the exhaust conduit upstream of an exhaust inlet of the turbocharger. In some cases, a compressor is in the intake conduit, and the exhaust gas recirculation conduit is coupled to the intake conduit downstream of a charge outlet of the compressor.

In some embodiments, a turbocharger is in the exhaust conduit and the condensate conduit is coupled to the exhaust conduit to direct at least a portion of the liquid into the exhaust conduit downstream of an exhaust outlet of the turbocharger. In some cases, a compressor is in the intake conduit and the exhaust gas recirculation conduit is coupled to the intake conduit to direct at least a portion into the intake conduit upstream of a charge outlet of the compressor.

In some embodiments, an exhaust manifold is in the exhaust conduit upstream of an exhaust inlet of the turbocharger and the condensate conduit is coupled to the exhaust manifold to direct at least a portion of the liquid into the exhaust manifold.

In some embodiments, systems also include an atomizer receiving the liquid.

In some embodiments, a turbine is in the exhaust conduit and the condensate conduit is coupled to the exhaust conduit to direct at least a portion of the liquid into the exhaust conduit upstream of an exhaust inlet of the turbine. In some cases, the exhaust gas recirculation conduit is coupled to the intake conduit downstream of a charge outlet of the compressor.

In some embodiments, a turbocharger in the exhaust conduit is mechanically coupled to the compressor and the exhaust gas recirculation conduit is coupled to the exhaust conduit downstream of an exhaust outlet of the turbocharger. In some cases, the exhaust gas recirculation conduit is coupled to the intake conduit upstream of a charge outlet of the compressor.

In some embodiments, the compressor is a belt-driven compressor.

In some embodiments, adding at least some of the condensate includes adding at least some of the condensate to the main exhaust stream between a combustion system of the engine and an exhaust outlet of a turbocharger. In some cases, adding at least some of the condensate includes adding at least some of the condensate to an exhaust manifold between the combustion system and the exhaust outlet of the turbocharger.

In some embodiments, adding at least some of the condensate comprises adding at least some of the condensate to the main exhaust stream after the main exhaust stream passes through a turbocharger.

In some embodiments, receiving the exhaust gas recirculation stream from the main exhaust stream comprises receiving the exhaust gas recirculation stream from the main exhaust stream before the main exhaust stream passes through a turbocharger. In some cases, methods also include passing an intake charge of the engine through a compressor and adding at least some of the exhaust gas recirculation stream to the intake charge of the engine after the intake charge passes through the compressor.

In some embodiments, receiving the exhaust gas recirculation stream from the main exhaust stream comprises receiving the exhaust gas recirculation stream from the main exhaust stream after the main exhaust stream passes through a turbocharger. In some cases, methods also include passing an intake charge of the engine through a compressor and adding at least some of the exhaust gas recirculation stream to the intake charge of the engine before the intake charge passes through the compressor.

In some embodiments, methods also include: compressing the inlet charge and then cooling the inlet charge; wherein at least some of the condensate is added to the inlet charge of the engine after the inlet charge is compressed and before the inlet charge is cooled.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Although it is desirable to reduce the temperature of the exhaust gases prior to adding them to the inlet charge, such cooling can condense liquids out of the exhaust gases. In embodiments of internal combustion systems described below, the condensed liquids are advantageously reintroduced into the internal combustion system (e.g., for cooling or to increase system fluid density).

Figure 1:
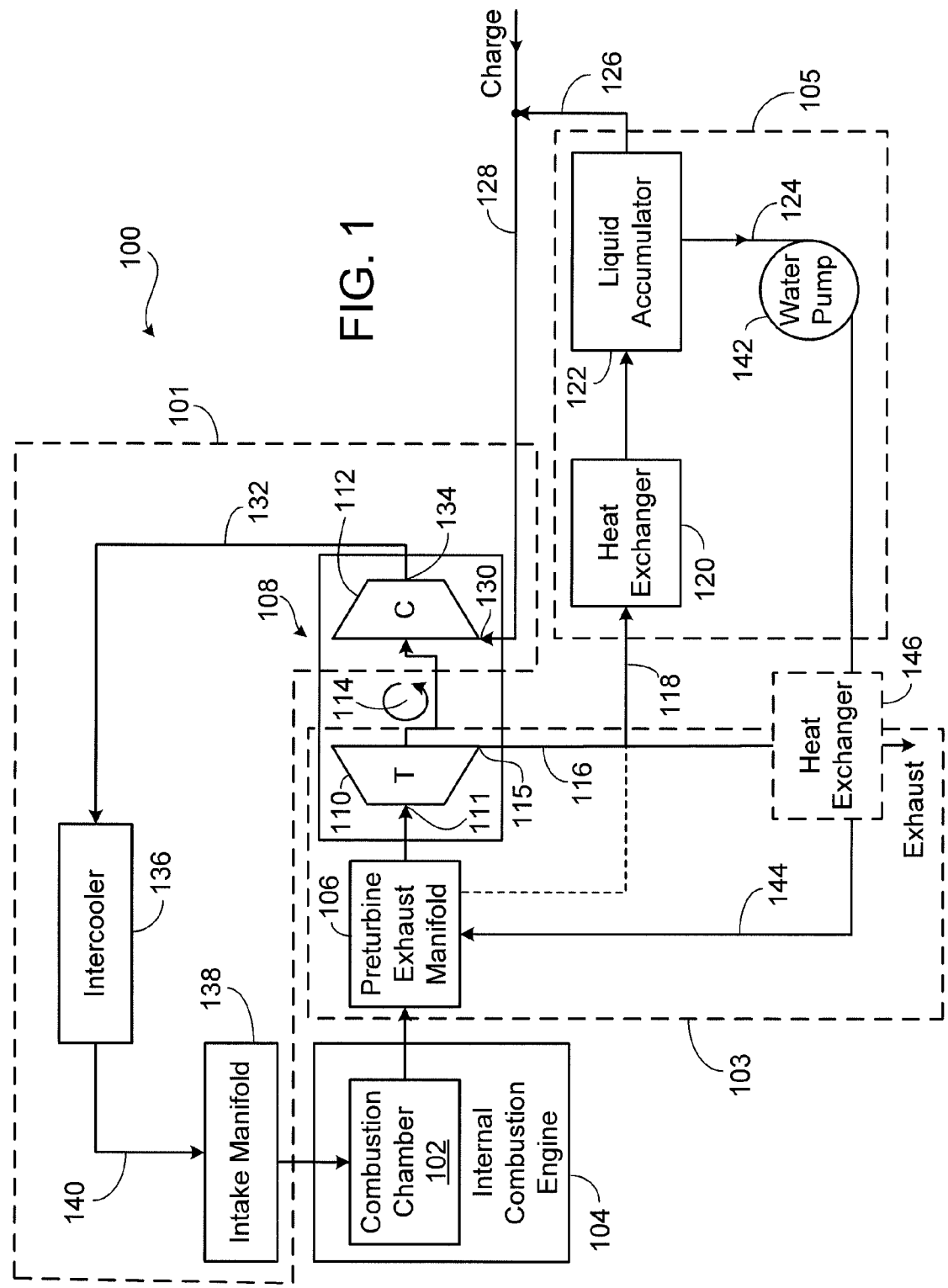
FIG. 1 is a block diagram of an internal combustion system including conduits for adding condensate from cooled exhaust gas into an exhaust system of the internal combustion system.

Referring to FIG. 1, internal combustion system 100 includes an intake system 101, an internal combustion engine 104, an exhaust system 103, and an exhaust gas recirculation (EGR) system 105. Internal combustion engine 104 can be any type of internal combustion engine such as, for example, a reciprocating piston engine, a rotary engine (e.g., Wankel rotary engine), or another engine. Intake system 101 provides a fuel and air mixture to internal combustion engine 104. Exhaust system 103 receives exhaust gas produced by combustion of the fuel and air from internal combustion engine 104 and discharges a portion of the exhaust gas to the atmosphere. EGR system 105 receives a portion of the exhaust gas from exhaust system 103. EGR system 105 cools received exhaust gas, discharges cooled exhaust gas to intake system 101, and recycles fluids condensed from the exhaust gas to exhaust system 103.

During engine operation, combustion chambers 102 discharge combustion byproducts (e.g., exhaust gas) to exhaust system 103 through exhaust ports (not shown) of internal combustion engine 104. This embodiment includes an exhaust driven compressor, turbocharger 108, and thus, exhaust system 103 includes a preturbine exhaust manifold 106, and an exhaust conduit 116. The system 100 may also or alternatively include additional turbochargers, other exhaust driven devices, or other devices. In some instances, exhaust system 103 can include additional or alternative components (e.g., a catalytic converter, an exhaust header, or other). Preturbine exhaust manifold 106 communicates exhaust gas to one or more turbines 110 of turbocharger 108. In this embodiment, the preturbine exhaust manifold 106 consolidates exhaust gas received from multiple exhaust ports into a single exhaust stream directed to an exhaust gas inlet 111 of the turbine 110.

Turbocharger 108 encompasses a turbine 110, with an exhaust gas inlet 111 as well as an exhaust gas outlet 115 and a compressor 112. In this embodiment, turbine 110 is coupled to drive gas compressor 112 of turbocharger 108 by a shaft 114. Other means can also be used to couple turbine 110 and compressor 112. Exhaust gas received by turbocharger 108 rotatably powers the turbine 110 and, through shaft 114, gas compressor 112 using principles and techniques well known to those skilled in the art. For example, more flow through turbine 110 increases the compression provided by turbocharger 108. The turbocharger 108 may also or alternatively include additional turbines, compressors, or other devices. For example, some embodiments include a turbocharger system with a primary turbine whose exhaust is directed to a secondary turbine (e.g., a turbocompound turbine) which further reclaims energy present in the exhaust. Such embodiments can include sequential turbocharging, series turbocharging, two-stage compression, two-stage compression with intercooling between stages, and forms of exhaust energy recovery.

Exhaust conduit 116 is in fluid communication with an exhaust gas outlet 115 of turbocharger 108 and conveys exhaust gas away from the turbocharger. In some instances, exhaust system 103 can include additional components (e.g., a catalytic converter, a silencer, a muffler, or other components), coupled to or disposed as part of exhaust conduit 116, which receive exhaust gas from the exhaust conduit. In some instances, exhaust conduit 116 may release the exhaust gas directly into the atmosphere.

In this embodiment, EGR system 105 receives a portion of the discharged combustion byproducts from exhaust system 103 subsequent to the exhaust outlet 115 of turbine 110. In this embodiment, EGR system 105 includes an EGR inlet conduit 118, EGR outlet conduit 116, an EGR heat exchanger 120, a liquid accumulator 122, and a water pump 142. EGR inlet conduit 118 receives a portion of the discharged combustion byproducts from exhaust conduit 116. In some instances, EGR inlet conduit 118 can be in fluid communication with and receive a portion of the discharged combustion byproducts from exhaust system 103 from a point upstream of the inlet 111 of turbine 108 (e.g., from preturbine exhaust manifold 106) or another point or structure.

EGR inlet conduit 118 is in fluid communication with an EGR heat exchanger 120 (e.g., a shell and tube heat exchanger, a plate heat exchanger, or other heat exchangers) and conveys at least a portion of the exhaust stream received from exhaust conduit 116 to the heat exchanger 120. In the current embodiment, EGR heat exchanger 120 cools exhaust gas received from EGR inlet conduit 118. In some embodiments, only a portion of the exhaust gas is cooled. Cooling at least a portion of the exhaust gas, prior to introducing the exhaust gas into a charge, can be beneficial for the performance, the reliability, and emissions of internal combustion engine 104. However, there is no need to cool exhaust gas to room temperature or lower as these advantages can be provided in some instances by any substantial temperature reduction. Heat exchanger 120 can be omitted in some instances.

The performance, reliability and emissions benefits of cooling exhaust gas prior to recirculation is often realized at temperatures below the condensation point of a liquid (e.g., water vapor or other vaporized fluids) present in exhaust gas. However, the presence of the condensed liquid in recirculated exhaust gas can damage and/or negatively affect the performance of components of internal combustion system 100 (e.g., turbocharger compressor, supercharger compressor, or other components). Therefore, it is desirable to remove at least a portion of the condensed liquid.

In this embodiment, a liquid accumulator 122 is in fluid communication with EGR heat exchanger 120 and separates at least a portion of the liquid condensation from the cooled exhaust gas. In some instances, EGR system 105 can include other fluid removal mechanisms (e.g., a liquid accumulator, a liquid trap, or other devices) that can remove liquid condensation from the cooled exhaust gas.

EGR outlet conduit 126 conveys cooled and dried exhaust gas away from the liquid accumulator 122 to intake system 101. In this embodiment, EGR outlet conduit 126 charge conveys cooled and dried exhaust gas to an inlet conduit 128 upstream of a charge outlet 134 of compressor 112. In some instances, EGR outlet conduit 126 can convey cooled, dried exhaust gas to other points or structures including, for example, compressor 112.

Liquid accumulator 122 in FIG. 1 communicates fluid through conduit 124 to water pump 142 which pumps accumulated liquid to exhaust system 103. In this embodiment, water pump 142 is a high pressure water pump. In some embodiments, other pumps can be used. In this embodiment, water pump 142 pumps condensate to preturbine exhaust manifold 106 via conduit 144. As a high pressure pump, water pump 142 can convey the condensate to preturbine exhaust manifold 106 to be atomized (e.g., in an atomizing nozzle (not shown) in preturbine exhaust manifold 106). When the atomized condensate is received by preturbine exhaust manifold 106, the condensate evaporates, thereby increasing the density of the fluid acting on the turbine, thus increasing the rotational power of turbine 110, compressor 112, and shaft 114. In multi-turbine embodiments, condensate can be transferred into one or more of the turbines.

Intake system 101 receives a portion of the cooled, dried exhaust gas prior to (e.g., upstream of) charge outlet 134 of compressor 112. In this embodiment, intake system 101 includes compressor 112 of turbocharger 108, an intercooler 136, an intake manifold 138, and associated conduits. Inlet conduit 128 is in fluid communication with a charge inlet 130 of compressor 112 and conveys charge to the compressor. In some instances, intake system 101 can include additional components (e.g., air filter or an air box) coupled to inlet conduit 128. Compressor 112 compresses (i.e., pressurizes) the charge, thereby increasing the volumetric efficiency of internal combustion engine 104. Pressurizing the charge increases the charge density introduced into internal combustion engine 104, thus increasing power output of the engine.

Compressor 112 is in fluid communication with intercooler 136 (e.g., an air-to-air cooler, a water-to-air cooler, or other cooler). Other embodiments may omit intercooler 136. Turbocharger 108 compresses incoming charge, causing the charge to become heated and less dense than cooler charge at the same pressure. By cooling the charge after compressor 112 with intercooler 136, more charge (and, consequently, more fuel) may be delivered to the engine thereby increasing power. Additionally, intercooler 136 may reduce the tendency for engine knocking.

Intercooler 136 is in fluid communication with intake manifold 138 and conveys the cooled charge to the intake manifold. Intake manifold 138 is in fluid communication with one or more inlet ports (not shown in FIG. 1) of internal combustion engine 104 and conveys the cooled charge through the inlet ports to combustion chambers 102.

Internal combustion system 100 can optionally include a heat exchanger 146 in which heat exchange between exhaust and condensate cools the exhaust and heats the condensate. In some instances, the condensate is heated enough to turn into a gas. In some embodiments, condensate is pumped to preturbine exhaust manifold 106 in liquid form. The liquid condensate absorbs energy both in the latent heat of vaporization during vaporization and because it is at a lower temperature than the temperature of the exhaust exiting the combustion chamber 102.

In other embodiments, condensed liquids can also be advantageously discharged from the EGR system into the intake system rather than or in addition to being discharged into the exhaust system. For example, some internal combustion systems perform in a substantially similar fashion as the previously described systems but use mechanically-driven compressors rather than exhaust-driven compressors. In such systems, discharging condensed liquids into the exhaust system does not provide increased power to a turbocharger as described with reference to FIG. 1. Accordingly, condensed liquids can be discharged to the intake systems for purposes including to provide cooling and/or to increase inlet charge density as well as to provide other advantages. Such use of the condensed liquids can be useful in systems with exhaust-driven compressors as well as those with mechanically-driven compressors in the intake system or without compressors in the intake system (e.g. naturally aerated systems)

Figure 2:
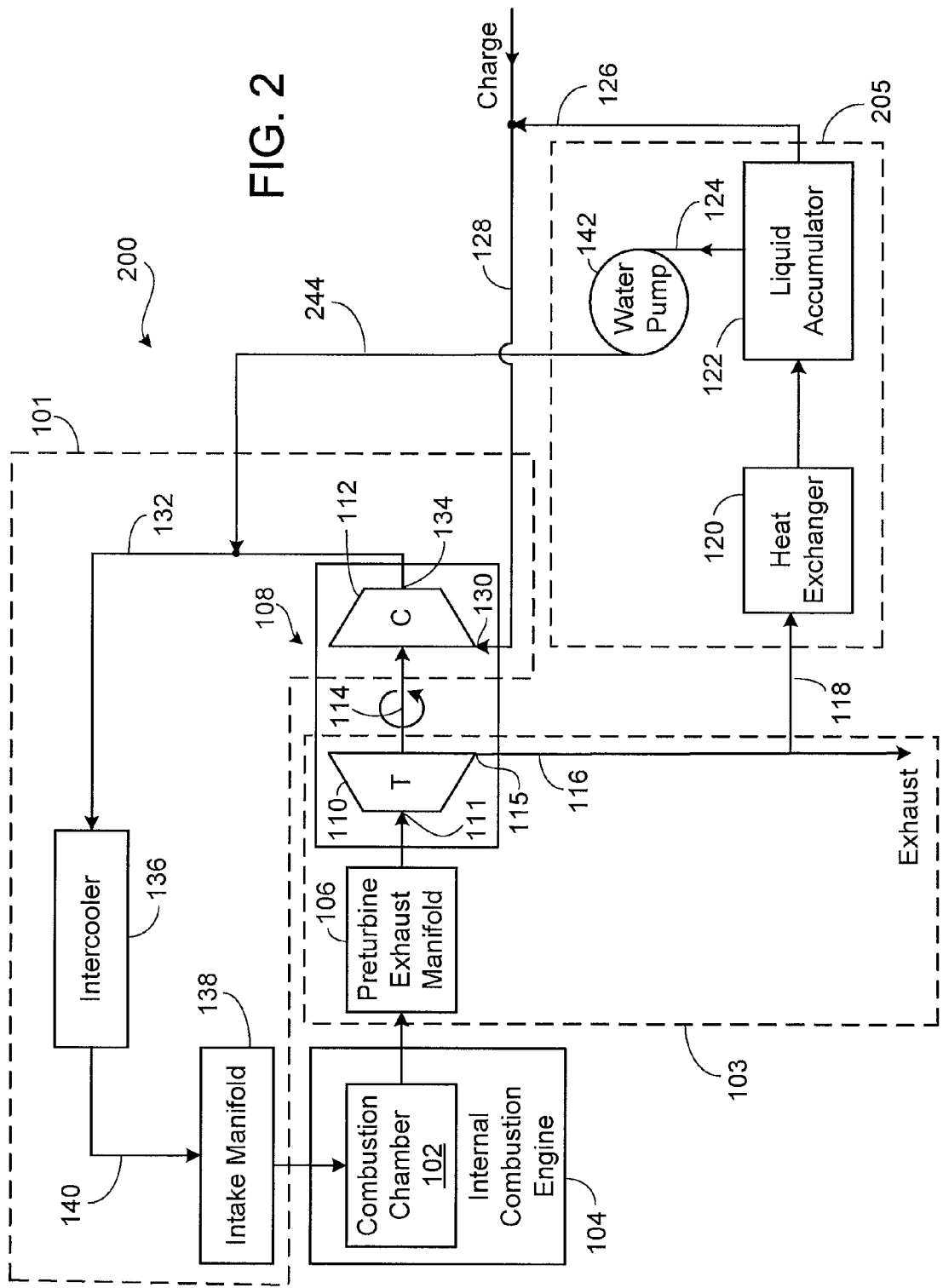
FIG. 2 is a block diagram of an internal combustion system including conduits for adding condensate from cooled exhaust gas into an intake system of the internal combustion system.

Referring to FIG. 2, for example, internal combustion system 200 operates in a substantially similar fashion to previously described internal combustion systems 100 (FIG. 1) except EGR system 205 recycles fluids condensed from the exhaust gas to intake system 101 rather than exhaust system 103. Also, although discussed with reference to turbocharger 108, system 200 may omit turbocharger 108 or may include other components in addition to or as an alternative to turbocharger 108 (e.g., multiple turbochargers, one or more mechanical compressors, or other exhaust driven devices). In some instances, the compressor can comprise a mechanically-driven (e.g., V-belt, toothed belt, flat belt, direct drive, gear drive, chain drive, or other suitable drive mechanism) positive displacement compressor (e.g., supercharger) rather than a turbocharger.

In this embodiment, EGR system 205 receives a portion of the discharged combustion byproducts from exhaust system 103 subsequent to an exhaust outlet 115 of turbine 110. As above, EGR system 205 may receive exhaust from elsewhere in the system 200.

Water pump 142 can pump condensate to one or more inlet conduits, for example, inlet conduits 132 or directly into intercooler 136. In this embodiment, water pump 142 discharges the condensate to inlet conduit 132 via conduit 244 to be atomized (e.g., by atomizing nozzle, not shown, in intake 101). When the atomized condensate is received by inlet conduit 132, the condensate cools the charge. In some instances, the condensate is not atomized.

When the temperature of the charge is decreased, the density of the charge increases, thereby reducing the cooling load of intercooler 136. Adding at least a portion of the condensate to the charge at or before intercooler 136, after the intercooler, or both, can increase the charge density, thereby increasing power. Additionally, the condensate can reduce the tendency for engine knocking. Further, cooling the charge after compressor 112 with the condensate can reduce the thermal load on intercooler 136, thereby reducing outlet temperature of intercooler 136.

In some cases, the accumulated liquid can be conveyed to intake system 101 at other points (e.g., subsequent to a charge outlet of the intercooler, prior to intake manifold 138, or the like).

Figure 3:
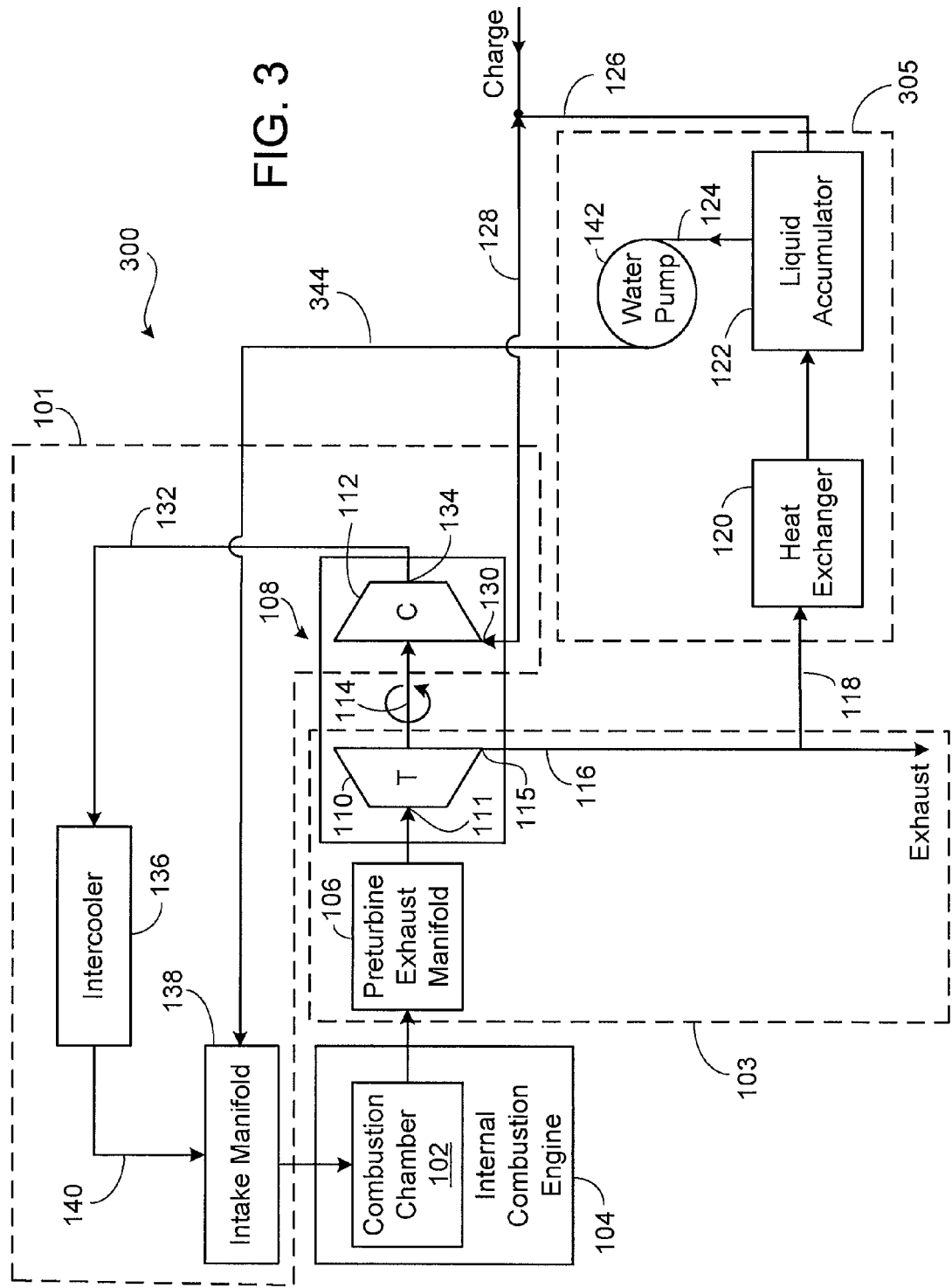
FIG. 3 is a block diagram of an internal combustion system including conduits for adding condensate from cooled exhaust gas into an intake manifold of the internal combustion system.

Referring to FIG. 3, internal combustion system 300 operates in a substantially similar fashion to previously described internal combustion systems 100 (FIG. 1) and 200 (FIG. 2) except EGR system 305 recycles fluids condensed from the exhaust gas directly to intake manifold 138 of intake system 101. Also, although discussed with reference to turbocharger 108, system 300 may omit turbocharger 108 or may include other components in addition to or as an alternative to turbocharger 108 (e.g., multiple turbochargers, one or more mechanical compressors, or other exhaust driven devices). In some instances, the compressor can comprise a mechanically-driven (e.g., V-belt, toothed belt, flat belt, direct drive, gear drive, chain drive, or other suitable drive mechanism) positive displacement compressor (e.g., supercharger) rather than a turbocharger.

The liquid accumulated by liquid accumulator 122 is conveyed to intake system 101 between the intercooler 136 and the engine 104 (e.g. into conduit 140 of inlet manifold 138). In this embodiment, water pump 142 pumps condensate to intake manifold 138 to be atomized (e.g. by atomizing nozzle in intake system 101) with the atomized condensate cooling the charge. In some instances, the condensate is not atomized.

In the embodiments discussed above, condensate is added to single points in the illustrative internal combustion systems. In some embodiments, condensate can be added to both the intake and exhaust systems either simultaneously and/or the distribution of condensate between sub-systems can be selectively controlled. In some cases, condensate can be input into multiple locations in the intake and/or exhaust systems.

Figure 4:
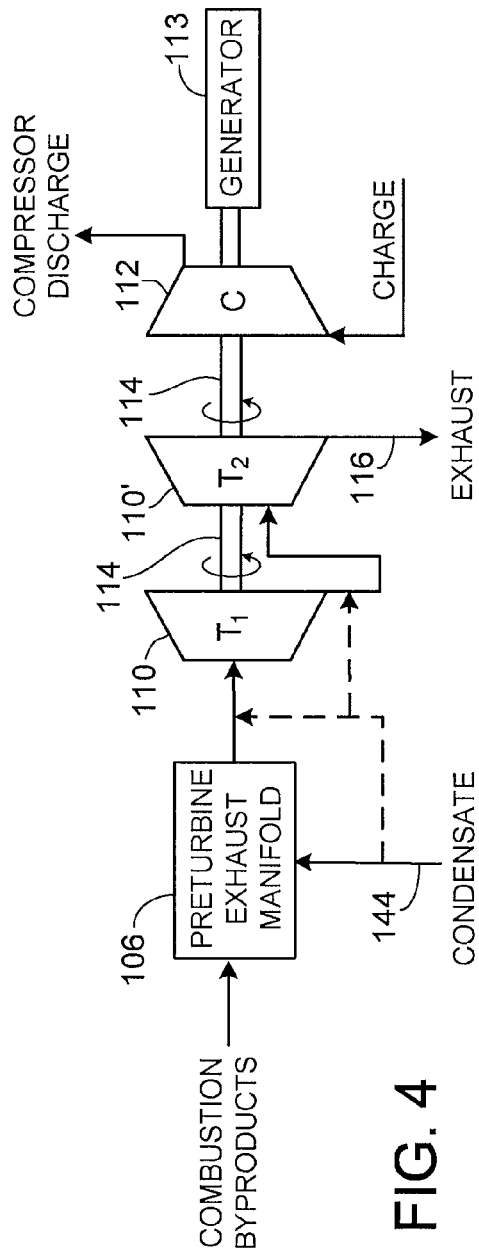
FIG. 4 is a block diagram of a turbo compounded turbine system.

In another example, shown in FIG. 4, an internal combustion system substantially similar to internal combustion system 100 (see FIG. 1) can be implemented with a turbo compounded turbine system. In this example, combustion byproducts are collected by preturbine manifold 106 which discharges a single exhaust stream to turbine 110. In this embodiment, turbine 110 and a second turbine 110' are coupled to compressor 112 and, optionally to drive a load, such as generator 113, by a single shaft 114. However, the turbine 110 and second turbine 110' can be coupled to one another, to the compressor 112 and/or to the load in other manners, for example using a gear train, multiple shafts, or in other manners. Also, the load could be one or more of a generator, compressor, pump, or other load. Exhaust from turbine 110 is directed to the inlet of second turbine 110'. Exhaust conduit 116 conveys exhaust gas away from the turbines 110, 110'. Exhaust gas received from exhaust manifold 106 powers the turbine 100 and the second turbine 110' and, through shaft 114, compressor 112 and generator 113. Alternatively, shaft power produced by the two turbines 110, 110' in excess of that required to drive compressor 112 can be put back into the engine drive shaft (not shown) through a gear train or in other manners. Condensate from the EGR system can be injected into the exhaust manifold 106, before the turbine 110, and/or between the turbine 110 and the second turbine 110'.

Figure 5:
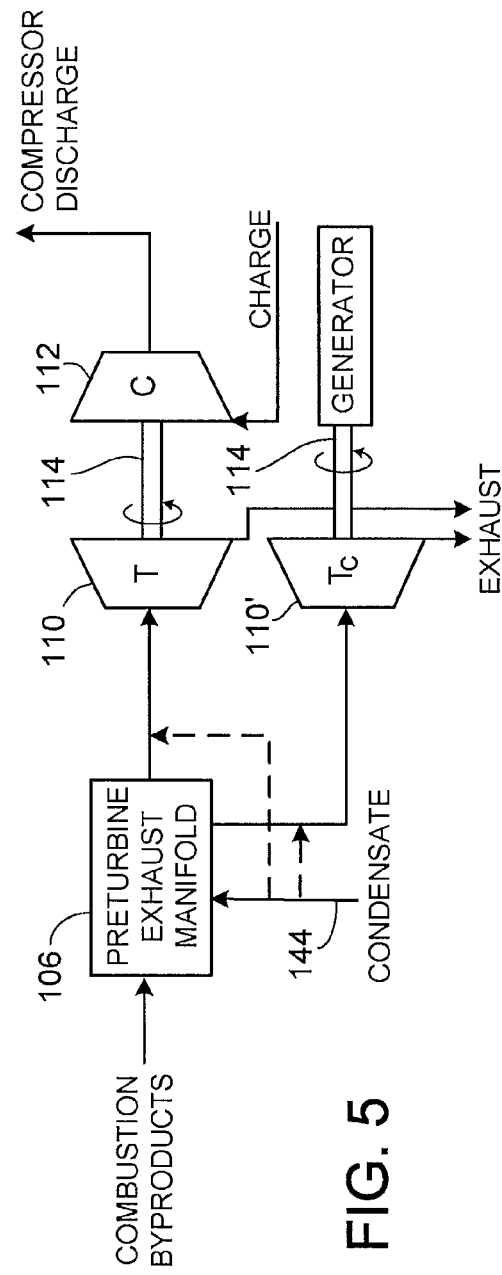
FIG. 5 is another block diagram of an turbo compounded turbine system.

In another example, shown in FIG. 5, an internal combustion system substantially similar to internal combustion system 100 (see FIG. 1) can be implemented with a second turbine driving a load rather than a compressor of the turbocharger. In this example, combustion byproducts are collected by preturbine manifold 106 which discharges a first exhaust stream to the turbine 110 and second exhaust stream to a second turbine 110'. In this embodiment, the turbine 110 is coupled to the compressor 112 and the second turbine 110' is coupled to a generator 113 by shafts 114. Exhaust conduit 116 conveys exhaust gas away from the turbocharger and the generator turbine 110'. Condensate from the EGR system can be injected into the exhaust manifold 106, into the exhaust directed to the turbine 110, and/or into the exhaust directed to the second turbine 110'.

Figure 6:
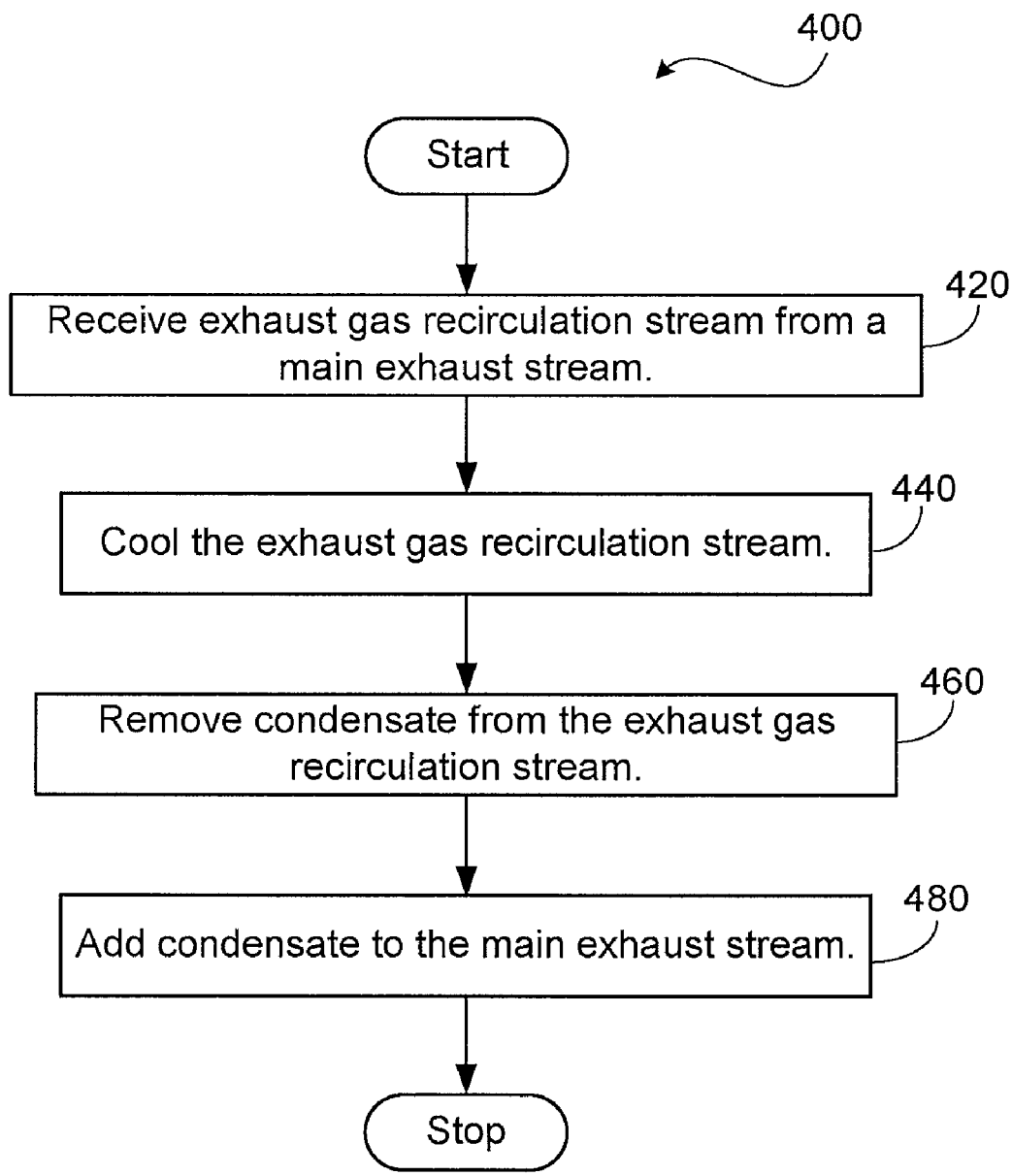
FIG. 6 is a flowchart of a method of implementing exhaust gas recirculation.

Referring to FIG. 6, an exemplary method 400 of operating internal combustion engine 104 includes receiving an exhaust gas recirculation stream from an exhaust system (e.g., of an internal combustion system) (step 420). At least part of the exhaust gas recirculation stream is then cooled (step 440). Method 400 further includes removing at least a portion of the amount of the condensate from the cooled exhaust gas recirculation stream (step 460). The condensate is then added back into the main exhaust stream (step 480).

The location(s) at which the condensate is added back into the main exhaust stream can be varied. In some instances, at least some of the condensate is added to the main exhaust stream between a combustion system of the engine and an exhaust outlet of a turbocharger (e.g., to an exhaust manifold disposed between the combustion system and the exhaust outlet of the turbocharger). In some instances, at least some of the condensate comprises adding at least some of the condensate to the main exhaust stream after the main exhaust stream passes through a turbocharger.

Similarly, the location(s) from which the exhaust gas recirculation stream is received from the main exhaust stream can be varied. In some instances, the exhaust gas recirculation stream is received from the main exhaust stream before the main exhaust stream passes through a turbocharger. In some cases, at least some of the exhaust gas recirculation stream is then added to an intake charge of the engine after the intake charge passes through the compressor. In some instances, the exhaust gas recirculation stream is received from the main exhaust stream after the main exhaust stream passes through a turbocharger. In some cases, at least some of the exhaust gas recirculation stream is then added to the intake charge of the engine before the intake charge passes through the compressor.

Figure 7:
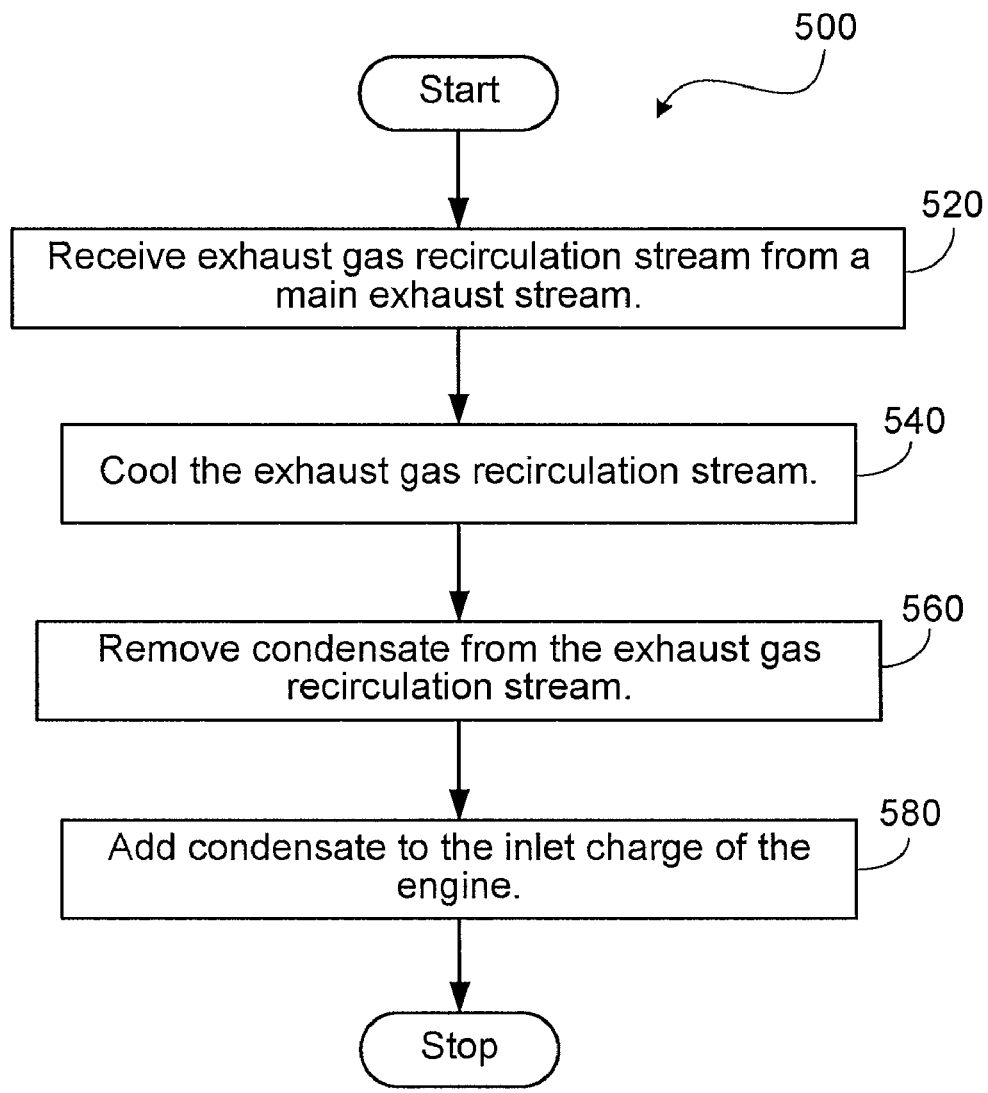
FIG. 7 is a flowchart of another method of implementing exhaust gas recirculation.

Referring to FIG. 7, an exemplary method 500 of operating internal combustion engines also includes receiving an exhaust gas recirculation stream from a main exhaust gas stream (step 420). At least a portion of the exhaust gas recirculation stream is then cooled (step 540) and condensate (e.g., at least some of any liquids formed by the cooling) is removed from the exhaust gas recirculation stream (step 560). At least a portion of the amount of accumulated condensate is then added to a charge stream of the internal combustion engine (step 580). In some instances, the inlet charge can be compressed and then cooled. At least some of the condensate can be added to the inlet charge of the engine after the inlet charge is compressed and before the inlet charge is cooled.

A number of embodiments have been described. Nevertheless, it will be understood that various modifications may be made without departing from the spirit and scope of the invention.

Accordingly, other embodiments are within the scope of the following claims.

What is claimed is:

1. A method of operating a turbocharged engine having an intake conduit, an exhaust conduit, a turbocharger with a turbine and a compressor, an exhaust gas recirculation conduit and a condensate conduit, the method comprising the steps of:
receiving an exhaust gas recirculation stream from a main exhaust stream;
cooling the exhaust gas recirculation stream;
removing at least some liquid condensate from the exhaust gas recirculation stream after cooling; and
directing at least some of the liquid condensate removed from the exhaust gas recirculation stream to the main exhaust stream between a combustion system of the engine and an exhaust outlet of the turbine of the turbocharger.

2. The method of claim 1, wherein the step of directing at least some of the liquid condensate comprises directing at least some of the liquid condensate to an exhaust manifold between the combustion system and the exhaust outlet of the turbine of the turbocharger.

3. The method of claim 1, wherein receiving the exhaust gas recirculation stream from the main exhaust stream comprises receiving the exhaust gas recirculation stream from the main exhaust stream before the main exhaust stream passes through the turbine of the turbocharger.

4. The method of claim 3, further comprising:
passing an intake charge of the engine through the compressor; and
directing at least some of the exhaust gas recirculation stream to the intake charge of the engine before~the intake charge passes through the compressor.

5. The method of claim 1, wherein receiving the exhaust gas recirculation stream from the main exhaust stream comprises receiving the exhaust gas recirculation stream from the main exhaust stream after the main exhaust stream passes through a the turbine of the turbocharger.

6. The method of claim 5, further comprising:
passing an intake charge of the engine through the compressor; and
directing at least some of the exhaust gas recirculation stream to the intake charge of the engine before the intake charge passes through the compressor.

7. A method of operating a turbocharged engine having an intake conduit, an exhaust conduit, a turbocharger with a turbine and a compressor, an exhaust gas recirculation conduit, and a condensate conduit, the method comprising the steps of:
receiving an exhaust gas recirculation stream from a main exhaust stream;
cooling the exhaust gas recirculation stream;
removing at least some liquid condensate from the exhaust gas recirculation stream after cooling; and
directing at least some of the liquid condensate removed from the exhaust gas recirculation stream to an inlet charge of the engine after adding the exhaust gas recirculation stream to the inlet charge of the engine.

8. The method of claim 7, further comprising:
compressing the inlet charge; and then
cooling the inlet charge;
wherein at least some of the liquid condensate is directed to the inlet charge of the engine after the inlet charge is compressed and before the inlet charge is cooled.

9. The method of claim 8, wherein compressing the inlet charge comprises using the compressor of an exhaust-driven turbocharger to compress the inlet charge.

10. The method of claim 9 further comprising cooling exhaust gas downstream of the compressor of the exhaust-driven turbocharger using at least a portion of the liquid condensate.

11. A system for operating on an engine, the engine coupled to an exhaust conduit and an intake conduit, the system comprising:
an exhaust gas recirculation conduit in fluid communication with the exhaust conduit and the engine to receive an amount of exhaust from the exhaust conduit and direct at least a portion of the amount of exhaust into the intake conduit;
a heat exchanger coupled to the exhaust gas recirculation conduit to cool at least a portion of the amount of exhaust;
a liquid accumulator that accumulates liquid condensate from at least a portion of the amount of exhaust in the exhaust gas recirculation conduit;
a turbocharger comprising a turbine disposed in the exhaust conduit; and
a condensate conduit coupled to the liquid accumulator and to the exhaust conduit to receive at least a portion of the liquid condensate and direct at least a portion of the liquid condensate into the exhaust conduit upstream of an exhaust outlet of the turbine of the turbocharger.

12. The system of claim 11, wherein the condensate conduit is coupled to the exhaust conduit to direct at least a portion of the liquid condensate into the exhaust conduit upstream of an exhaust inlet of the turbine of the turbocharger.

13. The system of claim 11, wherein a compressor is in the intake conduit, and wherein the exhaust gas recirculation conduit is coupled to the intake conduit to direct at least a portion of the amount of exhaust into the intake conduit upstream of a charge outlet of the compressor.

14. The system of claim 11, wherein an exhaust manifold is in the exhaust conduit upstream of an exhaust inlet of the turbine of the turbocharger and wherein the condensate conduit is coupled to the exhaust manifold to direct at least a portion of the liquid into the exhaust manifold.

15. The system of claim 11 further comprising an atomizer receiving the liquid.

16. A system for operating on an internal combustion engine, the internal combustion engine coupled to an intake conduit and an exhaust conduit, a compressor in the intake conduit that compresses an intake charge and an intercooler in the intake conduit that cools the intake charge, the system comprising:
an exhaust gas recirculation conduit in fluid communication with the exhaust conduit and the engine to receive an amount of exhaust and direct at least a portion of the amount of exhaust into the intake conduit before the compressor;
a heat exchanger coupled to the exhaust gas recirculation conduit to cool at least a portion of the amount of exhaust;
a liquid accumulator that accumulates liquid condensate from at least a portion of the amount of exhaust in the exhaust gas recirculation conduit; and
a condensate conduit coupled to the liquid accumulator and to the intake conduit to receive at least a portion of the liquid condensate and direct at least a portion of the liquid condensate into the intake conduit between the compressor and an outlet of the intercooler.

17. The system of claim 16, further comprising a turbine is in the exhaust conduit and wherein the condensate conduit is coupled to the exhaust conduit to direct at least a portion of the liquid condensate into the exhaust conduit upstream of an exhaust inlet of the turbine.

18. The system of claim 17, wherein the exhaust gas recirculation conduit is coupled to the intake conduit at a location downstream of a charge outlet of the compressor.

19. The system of claim 16, further comprising a turbine of a turbocharger in the exhaust conduit mechanically coupled to the compressor; and wherein the exhaust gas recirculation conduit is coupled to the exhaust conduit at a location downstream of an exhaust outlet of the turbine.

20. The system of claim 19, wherein the exhaust gas recirculation conduit is coupled to the intake conduit at a location upstream of a charge outlet of the compressor.

* * * * *